May 28, 1963
E. W. PIKE ETAL
AIRBORNE ELECTRO-MECHANICAL PRESSURE
SENSORY AND TELEMETRY SYSTEM
Filed May 16, 1960
3,091,122
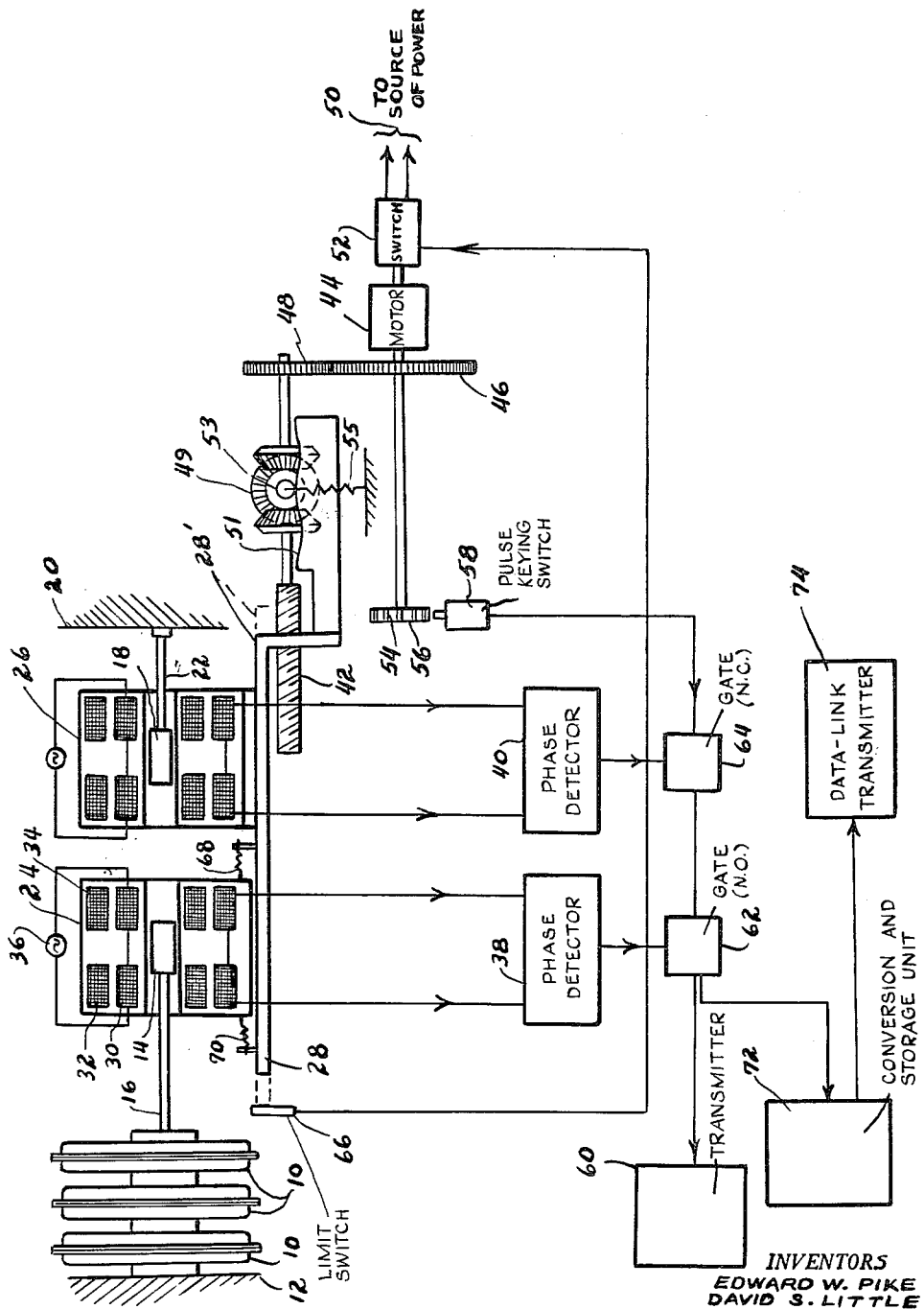
INVENTORS
EDWARD W. PIKE
DAVID S. LITTLE
FREDERICK C. MELCHIOR
BY
ATTORNEYS

United States Patent Office 3,091,122
Patented May 28, 1963

3,091,122
AIRBORNE ELECTRO-MECHANICAL PRESSURE
SENSORY AND TELEMETRY SYSTEM
Edward W. Pike, 7 St. Nicholas Drive, Shepperton, England; David S. Little, 35 Bogart Ave., Port Washington, N.Y.; and Frederick C. Melchior, 258 Riverside Drive, New York, N.Y.
Filed May 16, 1960, Ser. No. 29,466
6 Claims. (Cl. 73—398)

This invention relates to telemetry and, more particularly, to an airborne, electro-mechanical pressure sensing and telemetering system.

In recent years, increased air traffic and the necessity of maintaining safe separation of air traffic during all weather operations has resulted in developement of systems for air traffic control. In the United States, air traffic control is generally broken down into (a) Air Route Traffic Control: covering enroute traffic in designated Controlled Airspace between airports, (b) Approach and Departure Control: handling IFR arrivals into and departures from airports, and (c) Airport Traffic Control: handling traffic in the immediate vicinity of and on an airport.

Since the objectives of Air Traffic Control is to provide safe and expeditious movement of air traffic, including the necessary control of aircraft separation, the control function must obtain information as to the position, speed, and flight path. In general, the information has been supplied by the aircraft pilot in the form of position reports at specific points. Unfortunately, the present air traffic density is now such as to overburden the slow, cumbersome method of voice reporting of position and confirming of ATC clearances.

In addition, the air traffic density and the increasing variation between speeds of the individual aircraft in the control networks has made it clear that the present position reporting will not provide adequate information for proposed Air Traffic Control. It is clear that more information, rendered at more frequent intervals, is necessary to allow air traffic control systems to extrapolate from the position reports for flight path planning and control. Ground based computers can easily handle the necessary information storage and data processing. However, the data acceptance speed of computers and the increased information necessary for utilization of computer processing capabilities obsoletes cumbersome voice communication.

Of the many factors related to aircraft flight that must be reported to the ground control network, the factor of aircraft altitude, bearing directly on the air traffic control in the vertical plane, is of primary concern in the present application.

In some of the air traffic control systems proposed by the art, altitude of aircraft would be determined by height finding radar and processed by computer. While such system has the advantage of automatic information determination, the height finding radar has not been satisfactory despite intensive development. In addition, the expense of such system is high.

It is therefore one object of this invention to provide an improved method and means for telemetering from an aircraft its position in the vertical plane to a ground station.

Although it is necessary to convert the pressure sensor (such as an aneroid capsule) measurement into altitude units for the display in the aircraft to have significance to the pilot, such conversion is not necessary for transmission to a central computer. The computer can easily make this conversion, if necessary, or operate in pressure units if the vertical flight path information (e.g. obstacles) is stored in pressure units. Thus a reduction in the complexity, weight and size of the airborne unit is possible.

It is, therefore, a further object of this invention to provide an airborne pressure measuring sensor and associated telemetry system for periodically transmitting pressure information in pulse form to the ground station.

It is a further object of this invention to provide an improved method and means for automatically reporting aircraft altitude information at sufficiently close intervals to allow processing thereof into timely and significant extrapolation.

In accordance with these objects, there is provided in a preferred embodiment of this invention, a pressure responsive sensor comprising stacked aneroid capsules. Means are provided to detect the displacement of the capsule stack from the position corresponding to zero barometric pressure. Means responsive to the detected displacement are provided to gate a number of pulses from a pulse source of fixed pulse repetition rate. Thus the number of pulses in the gated pulse train will be responsive to the measured pressure. The pulse train may be transmitted directly to the ground stations or may be transformed into digitally coded pulses before transmission.

The transmission may be repeated at periodic intervals or in response to an interrogation signal from the ground only.

Other objects and advantages of this invention are set forth in the following description taken in combination with the accompanying drawing which is a schematic diagram of a preferred embodiment of the present invention.

In the FIGURE there is shown a schematic diagram of the airborne pressure data transmitting system comprising a pressure responsive sensor consisting of stacked aneroid capsules 10 joined at their central hubs. Each of the capsules are preferably of the concentrically corrugated diaphragm type in Melchoir Patent 2,760,260. One end of the stack is affixed to a structural member 12. Carried by the other end of the capsule stack is a first or sensor ferro-magnetic armature 14 movable in accordance with expansion and contraction of the stack and coupled thereto by a mounting rod 16. The armature movement is the summation of the deflection of the diaphragms of the capsules due to the coupling of the capsules and is, thus, greater and more easily detected than the deflection of any one capsule diaphragm. Also stacking of the capsules permits selective matching of the deflection characteristics of each capsule to improve the linearity of deflection over the operating range.

A second or reference ferromagnetic armature 18 is provided and is fixedly mounted on a structural member 20 by a mounting rod 22. The first and second armatures are preferably axially aligned for simplicity of detector mounting.

Detectors 24 and 26 are mounted on a support member 28 and are spaced apart thereon by a distance equal to the distance between the first and second armatures under zero barometric pressure. Each detector is preferably a balanced transformer, having primary windings 30 and secondary windings 32 and 34. By coupling the balanced transformer in conventional manner, such as by serially coupling primary and secondary windings with the secondaries in phase opposition and driving the primary by an alternating source 36, a signal will be generated across the secondary windings which will reverse in phase as the armature changes the interwinding coupling by movement through the null position. The signal voltage will vary in amplitude responsive to the displacement of the armature and will change phase dependent on the direction of displacement. The signals from the inductive pick-ups 24 and 26 are respectively coupled to the phase detectors 38 and 40. Thus the phase detectors will respond to traversal of the armature through the null position of the detector to detect the coincidence of the armature position and the detector null position.

Since the position of armature 14 changes with the ambient pressure, the detectors periodically traverse the armatures to determine the separation therebetween. The traverse drive comprises lead screw 42 which threadably engages mounting member 28. The lead screw is rotatably driven by means of a motor 44 through a gear train comprising gears 46 and 48 and differential 49. Electrical power from source 50 is selectively applied to the motor via switch 52.

Thus, the distance between the armatures will vary with variation in ambient barometric pressure. At zero barometric pressure, the distance between armatures corresponds to the separation of the detectors. At all other positive barometric pressures, the separation between armatures will be greater than the detector separation distance. The difference between the armature and detector spacing is related to the measured barometric pressure and is detected by scanning.

To scan, the detector mounting support member is first positioned at one extreme, such as the right hand position illustrated in dotted outline 28′. The switch 52 is closed to drive the detectors at a constant traversal speed. With a positive pressure, the armature 18 will pass through the null position of detector 26 first; then the armature 14 will pass through the null postition of detector 24. The increase in separation distance between the armatures responsive to the ambient pressure will thus be reflected in the time interval between detection of phase reversal by phase detectors 40 and 38 respectively.

Since the time interval between detections is thus related to the desired pressure measurement, it may be used to control signal transmission to the ground station. Since it is preferable to transmit information in form independent of amplitude for simplicity of equipment, means are provided to translate the time interval into a pulse train in which the number of pulses is related to the time interval.

For this purpose there is provided a pulse keying circuit comprising a star wheel 54 coupled to the shaft of motor 44. Each of the teeth 56 on the star wheel 54 initiates a pulse by tripping a switch 58. The pulse may be formed by keying a fixed frequency oscillator through the switch 58 or may be simply a fixed voltage pulse for biasing transmitter 60. The pulse keying circuit thus generates a train of spaced pulses on a time base corresponding to the traverse drive speed of the detectors.

Since only the increased separation of the armatures is of interest, a gating circuit is provided to block pulses having no significance from the transmitter 60. The gating circuit comprises gate elements 62 and 64 respectively associated with phase detectors 38 and 40. Thus when the armature 18 crosses the null position of detector 26, the phase detector 40 will trip element 64 opening the gate and allowing the pulse train from keyer 58 to reach the transmitter 60. When armature 14 crosses the null of detector 24, phase detector 38 will trip gate element 62 to close the gate. Thus the gate is open for a time interval corresponding to the increased separation of the armatures, which separation is related to the pressure to be measured. The pulses reaching the transmitter, since generated on a common time base with the traverse drive, thus correspond in number to the measured pressure.

It will be noted that the gating can be effected by a bi-stable element, such as a flip-flop circuit. Alternatively, element 62 may be a normally open switch closed by the phase detector 38 and element 64 a normally closed switch opened by phase detector 40.

Although the capsules in the capsule stack may be matched for linearity of response, it is rarely possible to ensure absolute linearity over the entire operating range. To compensate for non-linearity there is provided a cam 51 custom-calibrated for the specific capsule stack used. The cam surface will rotate the planetary web through coaction of the cam surface and the web shaft 53 which is urged into engagement with the cam surface by spring 55. The predetermined rotation of the planetary web will modify the linear drive of the scanning motor 44 to conform to and compensate for sensor non-linearity.

The scanning cycle may be repeated by providing a limit switching network 66 tripped by support 28 as it reaches the limit of travel. The limit switching network would reverse the direction of motor rotation and similtaneously reset the gating circuit. In this way repeated automatic scanning and transmission of altitude information in pulse form can be effected. Alternatively, the switch may be closed by an interrogation signal from a ground station, with the limit switching network serving merely to reset the system. In this manner information can be transmitted automatically and rapidly (when requested by Air Traffic Control by a suitable interrogation signal).

Thus, the number of pulses reaching the transmitter and transmitted to the ground air traffic control centers is directly related to the deplacement of armature 14, which displacement is, in turn, related to the absolute pressure imposed upon the capsule stack. The number of pulses may be translated directly into altitude at a ground computor station by means well known to the art. It would of course be possible to relate the pulses to aircraft altitude by conversion in the aircraft; however, the conversion is considered more economically taken on the ground to make the airborne equipment as simple and as light as possible. Further, since flight control related to pressure altitude prevails on international and on most domestic flights (above fixed altitudes), the pressure measurement is directly employable in most cases.

In the proposed data link systems, synchronous, digitally coded signals are employed. The pulse train passed by the gating circuit must be transformed into a compatible code for use with such systems. For this purpose there is provided a conversion and storage element 72 which in a preferred form would comprise a rotatable disc stepped through a fixed angle by a stepping relay operated by each pulse. Each angular movement would align the digital code equivalent to the number of pulses applied. The digitally coded signal is then applied to the data link transmitters 74 for combination with other position information and transmission to the ground station. Since the data link operates in response to an interrogation signal, a suitable disabling mechanism would prevent change in the stored information during readout in manner known to the art.

It will be noted that the armature mounted on the capsule stack will deflect under acceleration forces since the capsule stack is resilient. To prevent erroneous reading during such acceleration, the detector may be movably mounted on support 28 and coupled thereto through springs 68 and 70. By dynamically balancing the detector and armature, error due to difference in deflection under extraneous forces may be substantially eliminated.

It will be noted that compensation for acceleration forces may be effected by spring mounting the reference armature and dynamically balancing the reference and sensor armatures. Although such compensation is simpler than spring mounting the detector, the greater distance between sensor and reference armatures will preclude the same degree of compensation against shock loading of the instrument.

For ease in practicing this invention, but not by way of limitation, the following specific illustration is offered. The pulse train generated over the operating range (approximately 30 in. Hg) comprised 3000 pulses to provide altitude information accurate to 10 ft. at low levels and 40 to 50 ft. at high altitudes. As power for the primary windings of the detectors, the normal aircraft supply of 400 c.p.s. was used. Since the phase detectors require one cycle for reliable detection, the traverse speed was accordingly selected to ensure a full cycle generation before the armature moves through the detector. The full traversing required 8 seconds.

Thus in the specific illustration pressure altitude information could be transmitted at 8 second intervals. If interrogation response was used, an 8 second response period is necessary.

It is of course quate simple to increase the speed by merely increasing the primary winding frequency. By so doing, a faster traverse can be employed with concomitant increase in the pulse repetition rate. The need for such increase will, of course, depend primarily on the application intended.

This invention may be variously modified and embodied within the scope of the subjoined claims.

What is claimed is:

1. A pressure measuring system comprising a first and second detector coupled together at a predetermined separation distance, a pressure responsive sensor, a sensor armature coupled to said sensor to deflect in accordance with changes in pressure, a reference armature fixedly positioned and separated from the position of the sensor armature when said sensor armature is at the position responsive to zero pressure on the capsule by the same separation distance as said predetermined separation between detectors, means for driving said detectors past said armatures, said first detector adapted to generate a first signal as it passes said reference armature, said second detector adapted to generate a second signal as it passes said sensor armature, a source of electrical pulses, a utilizing network, means responsive to said first signal to pass said pulses to said utilizing network, and means responsive to said second signal to block transmission of pulses to said utilizing network.

2. A system in accordance with claim 1 in which said utilizing network consists of a transmitter.

3. A system in accordance with claim 1 in which the pulse repetition frequency of the pulses generated by said source is synchronized with the speed of the detector driving means to ensure correspondence between the number of pulses passed and the distance moved by said sensor armature at all speeds of detector drive.

4. A system in accordance with claim 1 in which each of said detectors comprises balanced transformers to generate an output signal which reverses in phase as the detector passes its respective armature and which includes a first and second phase detector respectively coupled to said first and second detectors and in which said means responsive to said first signal comprises a normally closed gate circuit coupled to said first phase detector, and in which said means responsive to said second signal comprises a normally open gate circuit coupled to said second phase detector, said first and second gate circuits being serially coupled together and between said source and said utilizing circuit.

5. A sysetm in accordance with claim 1 in which said second detector is spring mounted, the ratio of detector mass to the spring constant being substantially the same as the ratio of effective sensor armature mass to the effective spring constant of the pressure responsive sensor.

6. A system in accordance with claim 1 which includes means for periodically moving said detectors to scan said armature separation.

References Cited in the file of this patent
UNITED STATES PATENTS

| | | |
|---|---|---|
| 2,447,212 | Schoeppel | Aug. 17, 1948 |
| 2,572,481 | Hornfeck | Oct. 23, 1951 |
| 2,825,893 | Schechter | Mar. 4, 1958 |